Dec. 28, 1948.    L. E. LA BRIE    2,457,692
HYDRODYNAMIC TRANSMISSION
Original Filed Dec. 10, 1941    3 Sheets-Sheet 1
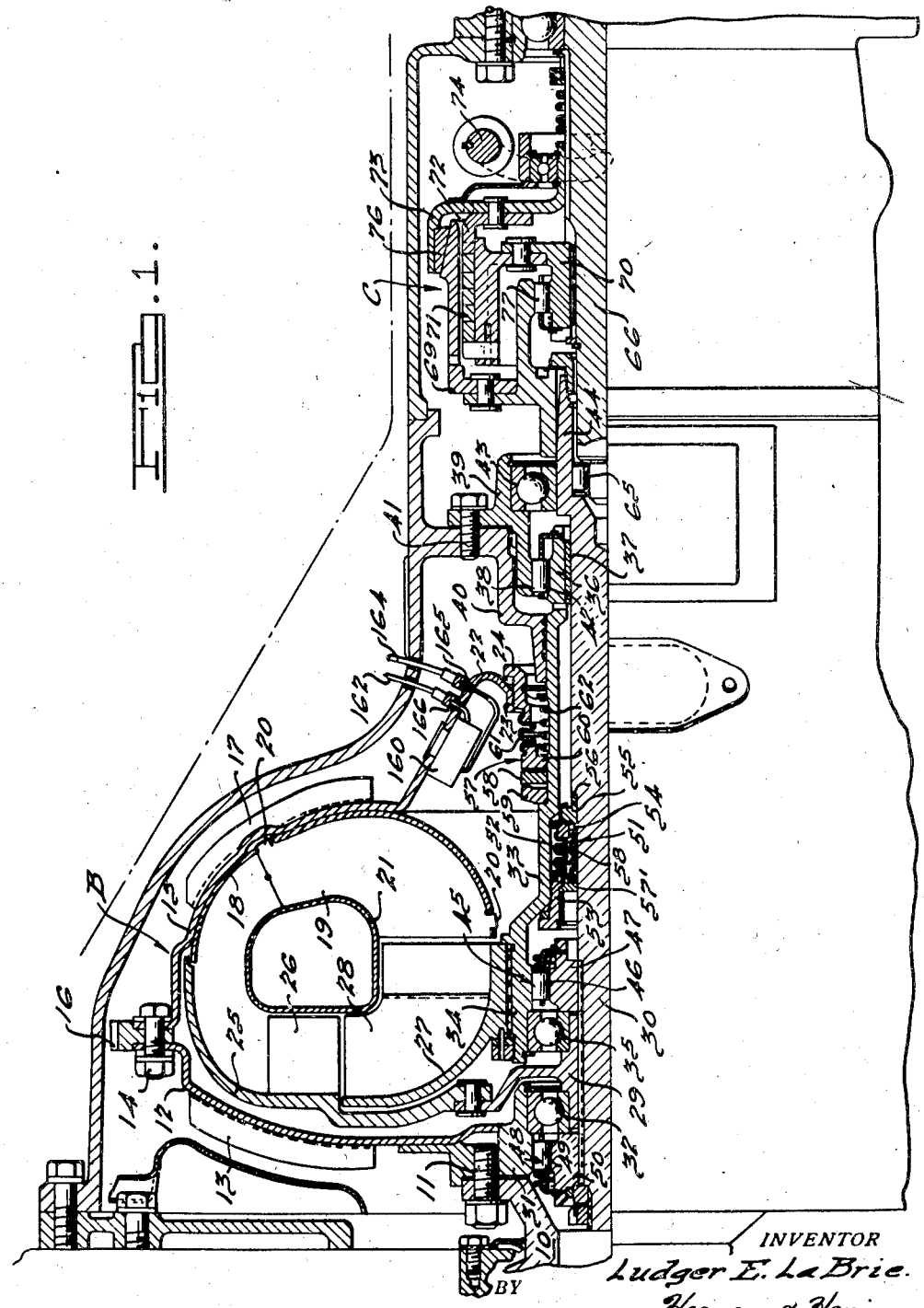
INVENTOR
*Ludger E. LaBrie*
BY *Harness & Harris*
ATTORNEYS

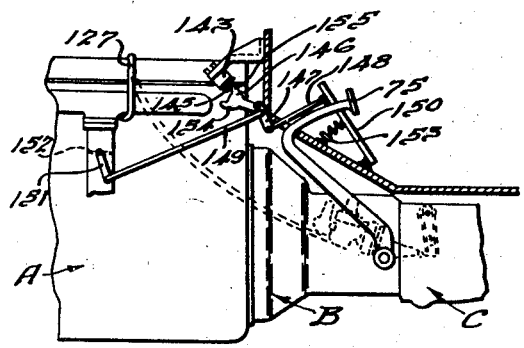

Dec. 28, 1948.  L. E. LA BRIE  2,457,692
HYDRODYNAMIC TRANSMISSION
Original Filed Dec. 10, 1941  3 Sheets-Sheet 3
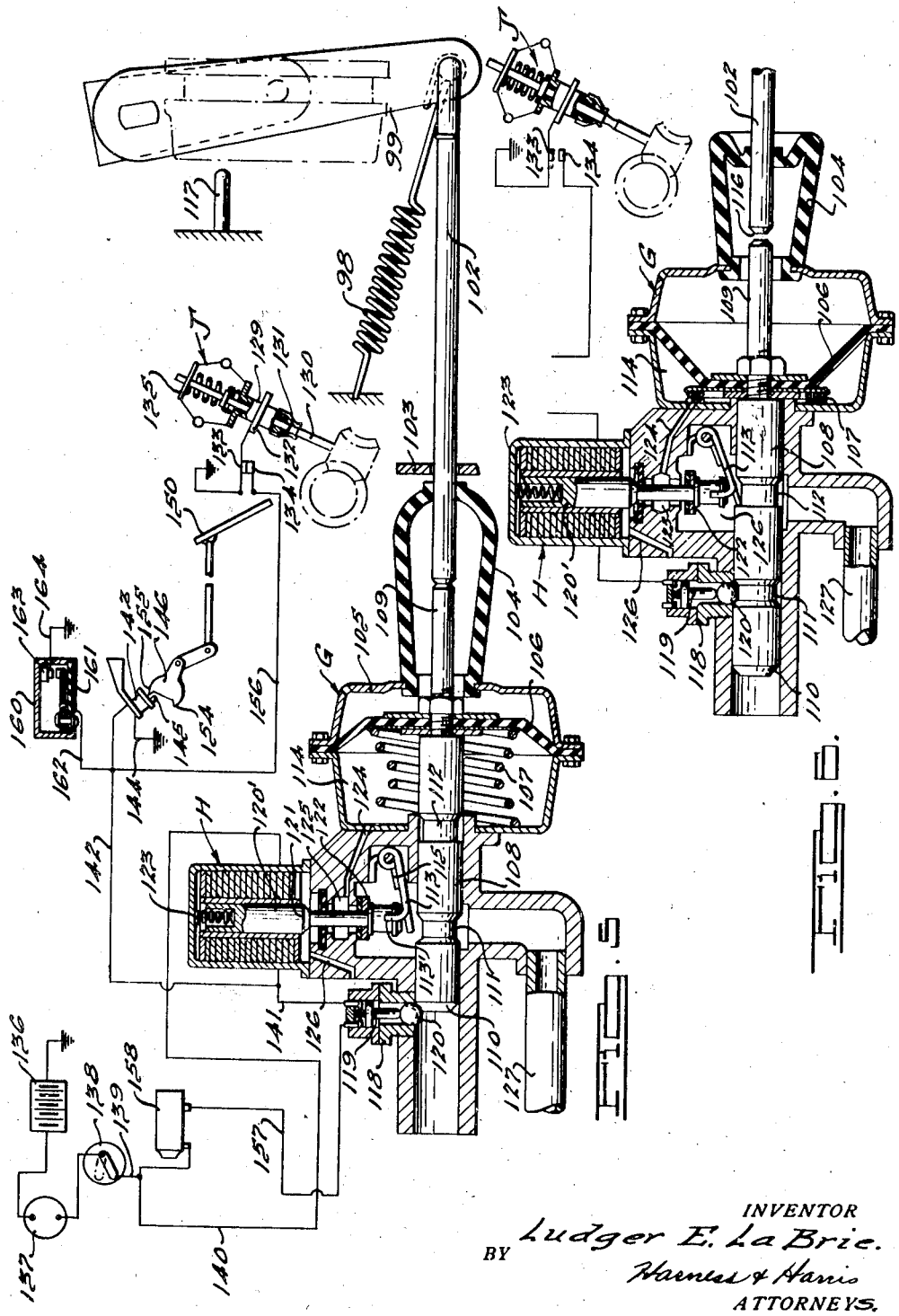
INVENTOR
Ludger E. La Brie.
BY
Harness & Harris
ATTORNEYS.

Patented Dec. 28, 1948

2,457,692

UNITED STATES PATENT OFFICE 2,457,692

HYDRODYNAMIC TRANSMISSION

Ludger E. La Brie, Detroit, Mich., assignor to Chrysler Corporation, Highland Park, Mich., a corporation of Delaware Original application December 10, 1941, Serial No. 422,369. Divided and this application December 6, 1943, Serial No. 513,061

18 Claims. (Cl. 74—189.5)

This invention relates to power transmissions and controls therefor and is especially concerned with fluid power transmission mechanisms. The application is a division of my copending application Serial No. 422,369, filed December 10, 1941, now abandoned.

In power transmissions employing fluid power transmitting devices the problem of cooling under heavy load conditions has been an important consideration. This has been particularly true where the fluid power transmitting device was of the torque converter type. In this connection, previous attempts to eliminate cooling tanks for the torque converter fluid have been generally unsuccessful because the fluid heats rapidly during operation of the converter for torque multiplication, and, if the converter is called upon to multiply torque for the purpose of ascending long hills and the like, the heating may be excessive.

The chief object of my invention is to provide means for preventing excessive heating of the fluid in fluid power transmitting devices especially those of the torque converter type.

It is also an object of my invention to provide means for automatically decreasing the load on the fluid power transmitting device when abnormal temperature conditions prevail in the fluid of such device.

A further object is to provide change speed mechanism for operation in conjunction with a fluid power transmitting device which is adapted for conditioning to decrease the load on the fluid power transmitting device when abnormal heat conditions prevail in the fluid of such device.

Another object of my invention is to provide a novel control mechanism responsive to temperature of the fluid in a fluid power transmitting device for automatically conditioning a change speed mechanism to reduce the load on such device at or above a predetermined temperature of such fluid.

The present invention preferably employs a fluid power transmitting device of the torque converter type and I have designed the vanes and wheels of this unit in such manner that the range of torque multiplication thereof is comparatively short, in the order of zero to 15 M. P. H. at full throttle. A gear transmission of the kickdown type is used with the converter and means is provided for effecting a stepdown in ratio whenever the temperature of the converter fluid rises above a predetermined maximum. The speed of the converter is thus increased and the load demand is less because of the torque multiplication through the gears. Accordingly, further temperature rise in the hydraulic fluid is thus prevented.

Other objects and advantages of my invention will become more apparent from the following description taken in conjunction with the accompanying drawings wherein I have illustrated a preferred embodiment of the invention.

Fig. 1 is a vertical sectional view of the upper portion of the forward part of the transmission.

Fig. 2 is a vertical section of the rear part or gearbox.

Fig. 3 is an enlarged detail of the synchrosleeve and its associated parts.

Fig. 4 is a partial view of a vehicle power plant embodying the invention.

Fig. 5 is a diagrammatic view of the control mechanism for the synchro-sleeve, the latter being shown in its released position.

Fig. 6 is a similar view of a portion of the Fig. 5 control mechanism in engaged position.

In the drawings, A represents the vehicle engine, B the torque converter, C a drive-releasing clutch and D the kickdown gearing.

The engine A has a crankshaft 10 to which is fastened by bolts 11, a housing shell 12 which carries air impelling fins 13. Secured to the shell 12 by cap screws 14 is a fluid impeller 15. A starting ring gear 16 forms part of the joint between the housing parts 12 and 15 and is adapted for engagement by the usual motor driven starting pinion (not shown).

The impeller 15 is provided with outer air impelling fins 17 and an inner shell member 18 which carries a plurality of fluid impelling vanes 19. The latter are attached to the member 18 by tabs 20 and a torus ring 21 is welded or otherwise suitably fastened to the inner peripheral edges of the vanes as illustrated. The impeller 15 has an inwardly tapered rear portion 22 provided with screw threads 23 adapted to receive and secure a fluid seal element 24.

A runner or turbine wheel 25 provided with vanes 26 is disposed in juxtapositioned driving relationship with the impeller 15 and a guide or reaction wheel 27 which has vanes 28. The runner is carried by a hub 29 which is splined on a shaft 30, an anti-friction bearing 32 separating the hub 29 from the impeller hub 31. The guide wheel 27 is splined on a hollow shaft 33 which has a forward enlarged portion 34 separated from the hub 29 by an anti-friction bearing 35.

The hollow shaft 33 terminates rearwardly in a reduced portion 36 which is separated from the shaft 30 by a bushing 37 and forms one part of an overrunning roller brake 38. The brake 38 also includes a stationary member 39 bolted to the inner casing extension 40 by bolts 41 and a set of rollers 42. The brake 38 is of the reverse lock type and functions in a manner well known in the art to prevent reverse rotation of the shaft 33 and guide wheel 27 while permitting free forward rotation thereof.

The stationary member 39 also carries a bearing 43, the inner race of which surrounds the enlarged hollow portion 44 of the shaft 30.

Disposed adjacent the bearing 35 is an overrunning clutch 45 which includes rollers 46 and a member 47 splined to the shaft 30. The clutch 45 is adapted to permit the shaft 30 to overrun the guide wheel 27, and to clutch the guide wheel to said shaft upon tendency of the former to overrun the shaft.

A second overrunning clutch 48 of the reverse lock type is drivingly disposed between the impeller hub 31 and the shaft 30. This clutch includes rollers 49 and a clutch member 50 and functions to permit the impeller 15 to overrun the shaft in the forward direction of rotation and to establish a driving connection therebetween upon tendency of the shaft 30 to overrun.

Between the shafts 30 and 33 is disposed a seal 51. This seal may be of any suitable type, but preferably includes a flexible bellows 52 secured at its ends to annular rings 53 and 54. The former has a screw-threaded connection with the shaft 33 and the latter is adapted to bear against a ring 55 which in turn bears on a ring 56 carried by the shaft 30. A spring 58 acts between the ring 54 and a member 57' carried by the threaded ring 53 and maintains a fluid tight fit between the rings 54, 55 and 56. The ring 55 floats between the rings 54 and 56 and has a lapped surface on each side thereof which bears on similar lapped surfaces of the rings 54, 56.

A similar type of seal, designated 57, is disposed between the shaft 33 and the impeller 15. The seal 57 comprises a floating ring 58 which floats between rings 59 and 60, the latter being attached to bellows 61. The other end of the bellows is secured to the member 24 and a spring 62 acts to press the rings 58, 59, 60 together.

It will thus be seen that the hydraulic converter is sealed off from the clutch C and gearing D by the seals 51 and 57, the springs 58 and 62 thereof being of sufficient strength to prevent escape of the converter fluid unless the pressure rises to an unsafe value.

During the torque multiplying stage of converter operation, the guide wheel 27 is stationary (the brake 38 being engaged) and the runner 25 "slips" with respect to the impeller 15 which is of course driven at engine speed. Under such conditions there is 100% slip between the impeller and guide wheel and between the runner and guide wheel. However, as soon as torque demand on shaft 30 decreases to a point where the reverse rotational tendency of the guide wheel disappears, the guide wheel begins to rotate forwardly as permitted by the overrunning brake 42; thus the slip on the seals 51 and 57 is rapidly reduced.

As is characteristic of torque converters of the "Tri-lock" type, the guide wheel accelerates rapidly upon beginning forward rotation until it reaches the speed of the runner 25 whereupon the roller clutch 45 functions automatically to lock the guide and runner wheels together. The torque converter then functions as an ordinary fluid coupling of the kinetic type and the slip on seal 51 is zero.

As the vehicle accelerates in speed accompanied by decreased torque demand, the runner gradually approaches the impeller in speed until cruising condition is reached. At cruising speeds, the slip between the impeller 15 and the two-part runner is in the order of 3% and the seal 57 is thus relieved.

When the vehicle is stationary with the clutch C engaged, the slip on seal 51 is zero because the runner and guide wheel are both stationary and the slip on seal 57 is 100%.

During normal vehicle operation, the period of slip between the runner and guide wheel is short because the hydraulic wheels are preferably designed such that the range of torque multiplication ends at approximately 15 M. P. H., thus the seal 51 is subjected to relative rotation for an extremely small percentage of vehicle operating time.

While there is always some slip between the impeller and the guide wheel, it is in the order of 3% at cruising speeds which means that only 3% slip is effective on the seal 57 during the major period of vehicle operation.

By means of this simple and ingenious arrangement of hydraulic wheels and seals, the wear on the seals is greatly reduced compared to conventional arrangements, friction is reduced and possibility of seal noise practically eliminated.

Piloted in the hollow rear portion of the shaft 30 by means of bearing rollers 65 is the forward end of a shaft 66 which extends rearwardly into the gear casing 68 where it is formed with a pinion 67. A friction clutch C of the mechanical servo type drivingly connects the shafts 30 and 66.

The clutch C is fully described and claimed in my copending application, Serial No. 379,786 filed February 20, 1941, now Patent No. 2,374,688 dated May 1, 1945, and it is deemed sufficient for purposes of the present description to state that the clutch comprises a driving element 69 fixed to the shaft 30 and a driven element 70 fixed to the shaft 66. These two elements are adapted to be frictionally connected by a spring 71 which is expanded by a finger 72 carried by a pilot member 73. The pilot 73 is slidable by means of the released mechanism 74 and pedal 75. When the friction lining 76 of the pilot is engaged with the driving element 69 as shown in Fig. 1, a drive is transmitted from shaft 30 to shaft 66. Upon tendency of the shaft 66 to overrun the shaft 30, as for example during coasting of the vehicle, the overruning roller clutch 77 functions to lock the two shafts together thereby preventing free wheeling and providing a two-way drive. While the servo clutch is preferred, a conventional type of friction clutch may be substituted if desired.

Referring now to Figs. 2 to 6, inclusive, it will be seen that the drive pinion 67 is disposed in constant mesh with the gear 76 which drives a countershaft cluster 77 through an overrunning clutch 78 of the usual type such that when shaft 66 drives in its usual clockwise direction (looking from front to rear) then clutch 78 will engage to lock gear 76 to the countershaft cluster 77 whenever the gear 76 tends to rotate faster than the cluster. However, whenever this gear 76 tends to rotate slower than the countershaft, then clutch 78 will automatically release the rollers overrunning whereby shaft 66 may fall off in speed while cluster 77 continues to revolve.

Countershaft cluster 77 comprises cluster gears

78' and 79 which respectively provide forward and reverse drives. The transmission main shaft 80 is piloted into the hollow portion of the pinion 67 in accordance with the conventional practice, the pinion 67 being supported in the casing 68 by means of a bearing 81. Adjacent the rear end of the shaft 80 a bearing 82 journals the shaft in the casing 68. Freely rotatable on the shaft 80 is a sleeve 83 which has formed thereon a gear 84 disposed in mesh with the countershaft cluster gear 78', a hub 85 which carries a shiftable sleeve 86, and clutch teeth 87. A hub 88 is splined on the shaft 80 and carries therewith a manually shiftable sleeve 89 which is adapted to be shifted by suitable remote shift mechanism (not shown) from its illustrated neutral position forwardly to clutch with the teeth 87, a blocker 90 being disposed between the sleeve 89 and the clutch teeth 87 to facilitate shifting and prevent clashing of teeth.

Shaft 80 also carries a reverse driven gear 91 which is fixed thereto. A reverse idler gear 92 is suitably mounted on its own countershaft such that when reverse drive is desired, idler 92 is shifted into mesh with the gears 79 and 91.

Shifting of the reverse idler gear 92 is preferably controlled by the remote shift mechanism, thus it may be seen that forward drive or reverse drive may be obtained by selective manipulation of sleeve 89 and gear 92, clutch C being released by depression of the pedal 75 when shifting into one of these drives.

The sleeve 86 is slidably splined on the hub portion 85 and is adapted to be shifted forwardly to clutch with teeth 93 formed integrally on the shaft 66 under control of a blocker 94. The sleeve 86 is adapted to be shifted by power means to step up the speed ratio from low speed drive to high speed drive, the latter being a direct drive through the gearing.

When driving the car forwardly, the manual sleeve 89 is engaged with the clutch teeth 87 and the car is started in low speed drive ratio, the drive being from the shaft 66 through pinion 67, gears 76, 78' and 84, sleeves 89 and hub 88 to the shaft 80.

Power operated mechanism about to be described is operable under certain conditions of vehicle drive to shift the sleeve 86 forwardly to clutch with the teeth 93 whereupon a direct drive between shafts 66 and 80 is obtained. This step-up in drive is accommodated through overrunning of the clutch 78 in response to driver release of the accelerator pedal as the desired speed has been reached whereupon the power mechanism will accomplish forward shift of the sleeve 86 when the rotational speed of the pinion 67 and clutch teeth 93 has been retarded to a speed synchronous with the speed of the sleeve 86.

A step-up in speed ratio during reverse driving may be accomplished in a similar manner by release of the accelerator pedal after a predetermined speed in reverse has been reached. Thus a low speed reverse drive may be obtained through pinion 67, gears 79, 92 and 91 and a high speed reverse drive may be obtained through pinion 67, sleeve 86, gears 84, 78', 79, 92 and 91.

The above described mechanism is more fully described and illustrated in Dunn Patent No. 2,257,674, issued September 30, 1941.

The power means for controlling shift of the sleeve 86 comprises a pressure fluid operated motor G which utilizes air pressure for its operation. For convenience, this motor is arranged to operate by the vacuum or suction of the intake manifold system of the engine under control of electromagnetic means illustrated in the form of a solenoid H.

Forward shift of the sleeve 86 is effected under control of motor G by reason of a spring 98 fixed at one end and exerting a pull on lever 99 which is connected to the sleeve 86 through the cross shaft 100 and shifter yoke 101. Pivoted to the lower end of the lever 99 is a follower rod 102 guided in the support 103 and in a rubber sealed booth 104 carried by a cylinder 105 which contains a diaphragm 106 urged in a direction to release the sleeve 86 by a spring 107 which is of relatively greater strength than the spring 98. Diaphragm 106 is connected to a leader rod 108 which has a rear extension 109 aligned with the rod 102.

The rod 108 has a series of detents 110, 111 and 112, the latter cooperating with a latch 113 such that when vacuum is admitted to the chamber 114 to cause the piston 106 and rod 108 to assume their Fig. 6 positions, latch 113 under action of rat trap spring 115 catches on the forward shoulder of detent 112 and holds the parts in Fig. 6 position. At this time rod portion 109 moves further than rod 102 by the amount of gap 116, a stop 117 acting on lever 99 limiting forward movement thereof under the influence of spring 98.

In order to provide for release of sleeve 86 thereby to secure an automatic step-down in gear ratio without necessitating release of the clutch C, it is desirable to provide some means for momentarily relieving the torque load at the teeth 93 and in the present instance, this means has been provided through grounding of the ignition system. This ignition interrupting system is under control of an ignition interrupter switch 118 which is closed by a plunger 119 and ball 120 whenever rod 108 moves between its Fig. 5 and Fig. 6 positions by reason of the enlarged portion of the rod between the detents 110 and 111. Detent 111 is so arranged that with the parts in the Fig. 6 position and sleeve 86 clutched with clutch teeth 93, rod 108 may move rearwardly sufficiently to close the gap 116 thus taking up the lost motion between the rod portions 109 and 102 which movement of the rod 108 causes the switch 118 to close and ground the ignition system whereupon spring 107 will then cause further rearward movement of the rod 108 and rod 102 to release sleeve 86, the switch 118 opening as soon as the detent 110 comes under the ball 120.

The vacuum supply to the chamber 114 is under control of a solenoid H which comprises an armature plunger 120' having valve parts 121, 122. In Fig. 5 the solenoid H is shown energized, the plunger 120' being raised against the spring 123 to seat the valve 122 and shut off the vacuum supply to the chamber 114 while at the same time valve 121 is unseated so as to vent this chamber through the passage 124, chamber 125 and vent passage 126. When the solenoid is de-energized, then the spring 123 lowers the plunger 120' thereby seating valve 121 to shut off vent 126 and opening valve 122 as illustrated in Fig. 6 to thereby open chamber 114 to the intake manifold of the engine A through passage 124, chamber 125, chamber 126 and pipe 127.

A certain lost motion is provided between plunger 120' and the inwardly bent finger 113' of the latch 113 so that when the plunger moves downwardly the latch may subsequently catch in the detent 112 when the vacuum has operated the piston 106, the parts then remaining in Fig. 6 position independently of the vacuum in chamber 114 until the solenoid H is energized to release the latch and vent the chamber 114.

Preferably energization and de-energization of the solenoid H is controlled by a governor mechanism. This governor mechanism designated generally by the letter J is driven from the countershaft cluster gear 78', the governor being provided with a sleeve 129 which is thrust outwardly along the drive shaft 130 as the car speed reaches a predetermined value, the break-away being under control of a detent 131.

The sleeve 129 has a shoulder 132 engaged by the swinging switch piece 133 of the governor switch 134. When the car is stationary, the detent 131 is engaged and the switch 134 is closed. As the car accelerates, the governor eventually reaches its critical speed and detent 131 releases, thereby causing switch 134 to open. As the car slows down, the governor spring 135 restores the parts to Fig. 5 position and by suitably proportioning the various parts, it is obvious that the switch 134 may be made to function at desired speeds proportionate to car travel. With the present transmission arrangement wherein the hydraulic torque converter provides torque multiplication through a range up to approximately 15 M. P. H., the governor J is preferably arranged to open the switch 134 at a speed in the neighborhood of 22 to 25 M. P. H., thus providing a two stage acceleration range up to approximately 25 M. P. H. wherein both the hydraulic action and the gearing multiply torque during the first stage and the gearing alone multiplies torque during the second stage.

As the car slows down, the governor spring 135 restores the parts to the Fig. 5 position and by proportioning the various parts, it is obvious that the switch 133 may be made to function. At desired speeds proportionate to car travel, it is preferred to have the switch close in response to slowing down of the vehicle at a speed lower than that at which it opens upon acceleration of the vehicle. This prevents hunting and undesirable cyclic operation.

Referring now to Fig. 5, it will be seen that I have illustrated the control circuit for the transmission as well as a portion of the engine ignition circuit.

One side of the solenoid H is connected to the vehicle battery 136 through an ammeter 137, ignition switch 138, wire 139 and wire 140. The other side of the solenoid is connected to ground through wires 141 and 142, switch 143 and wire 144, the vehicle battery of course being grounded as is usual in automotive practice. The switch 143 is arranged to be operated by the vehicle accelerator pedal as illustrated in Fig. 4, it being seen from that figure that the switch has an operating finger 145 adapted to be operated by a lever 146 which is carried by lever 147. The latter is pivoted on the vehicle floor boards and has links 148 and 149 pivotally connected therewith. The link 148 is connected to be actuated by the vehicle accelerator pedal 150 and the outer end of the link 149 is pivotally connected to the throttle lever 152 of the carburetor. A return spring 153 biases the accelerator pedal to engine idle position and the arrangement is such that when the accelerator pedal is depressed to substantially wide open throttle position, the finger 154 of lever 146 will engage the operating finger 145 of the switch 143 thereby to close the switch. A second finger 155 formed on the lever 146 is arranged to open the switch 143 when the accelerator pedal has been returned to substantially engine idle position.

A speed responsive switch 133 is connected by means of a wire 156 with the wire 142. Thus it may be seen that operation of the switch 143 by depression of the accelerator pedal 150 to substantially wide open throttle position will overrule the switch 133 and energize the solenoid H. The driver is thus enabled to "kickdown" to a lower speed ratio at any time. Thus the increased torque multiplication made available by disengagement of the synchro sleeve 86 is instantly available.

In order to effect release of the synchro sleeve 86 and step down in speed ratio, it is necessary that the drive of the engine be diminished momentarily so that the load on the teeth of the synchro sleeve will be released. This is accomplished in the present arrangement by grounding the ignition and the circuit for rendering the ignition momentarily inoperative will now be described. This circuit includes the switch 118 which is connected to ground through the kickdown switch 143 by means of wire 141, the other side of the switch 118 being connected by wire 157 to the ignition coil 158. From Figs. 5 and 6, it may be seen that when the switch 143 is closed, solenoid H will be energized and as soon as the rod 108 has moved sufficiently to take up the gap 116, switch 118 will close thereby connecting the ignition coil 158 to ground through wires 141, 142 and 144.

Grounding of the ignition will immediately relieve the torque on the synchro sleeve 86 and permit the spring 107 to shift the sleeve out of mesh with the clutch teeth 93 as has been described. As soon as the detent 110 comes underneath the ball 120 of the switch 118, the ignition will be restored and the vehicle will be driven in its low speed ratio at wide open throttle. As the finger 155 of the lever 146 does not engage the switch finger 145 to open the switch until the accelerator pedal 150 is returned to substantially idle position, the driver may drive the vehicle at any intermediate throttle opening in low speed drive ratio for any length of time he desires. Release of the accelerator pedal under such conditions that the vehicle will coast will result in automatic engagement of the synchro sleeve through operation of the solenoid H and servo motor G as aforesaid providing that the speed of the vehicle is above the cut-in speed of the governor mechanism J.

It will be noted that the ignition is grounded through the speed responsive switch 133 in a manner similar to that just described when the latter switch closes in response to slowing down of the vehicle.

Referring now to Figs. 1 and 5, it will be seen that a temperature responsive switch 160 is disposed within the casing shell 15 of the torque converter fluid. This switch comprises a bi-metallic element 161 which is connected by means of a wire 162 with the conductor 142 which leads to the main solenoid energizing and ignition grounding circuit. The bi-metallic element 161 is adapted to engage a terminal 163 which is connected to ground through a wire 164. As illustrated in Fig. 1 the wires 162 and 164 are actually connected to the switch 160 by means of a pair of slip rings 165, 166.

The switch 160 is arranged such that the bi-metallic element 161 will close the switch should the temperature of the fluid and/or gases in the torque converter become dangerously high. Closure of the switch 160 will result in step-down of the transmission speed ratio to low speed ratio in a manner exactly similar to that obtained through operation of the speed responsive switch 133 and the kickdown switch 143. The switch 160 will remain closed as long as the temperature within the converter housing is higher than the predetermined temperature for which the switch is set.

Thus it may be seen that a step-down to low speed ratio is effected in response to attainment of abnormal temperature within the torque converter and as the step-down to lower speed ratio will result in the speeding up of the torque converter as a whole, more air will be drawn in through the housing by the air impelling vanes 13 and 17 which will result in a cooling of the torque converter and in addition the load thereon will be relieved because of the torque multiplication afforded by the gearing.

It may thus be seen that I have provided a simple form of automatic transmission embodying a hydraulic torque converter which is arranged in such manner that it has a relatively short torque conversion range in view of which air cooling of the converter may be resorted to. As a safety feature, I have provided means for securing automatic step-down in the gear box portion of the transmission in response to the attainment of abnormally high temperature in the torque converter.

I claim:

1. In a power transmission for a vehicle having an engine, a fluid power transmitting device drivingly connected to the engine, change speed means drivingly connected to said device and adapted to provide a plurality of different speed ratio drives for said vehicle, and means including control means operative in response to departures from the normal operating physical condition of the fluid in said device and operable at a predetermined condition of said fluid for effecting a change in the speed ratio drive of said vehicle.

2. In a power transmission for a vehicle having an engine, a fluid power transmitting device drivingly connected to the engine, change speed means drivingly connected to said device and adapted to provide a plurality of different speed ratio drives for said vehicle, and means including control means arranged as to be subject to the influence of temperature changes in the fluid of said device and operable at a predetermined temperature condition of the fluid in said device for effecting a shift in said change speed mechanism from a higher to a lower speed ratio drive.

3. In a power transmission for a vehicle having an engine, a fluid power converter of a type adapted to provide a torque multiplying drive and a slip coupling drive for said vehicle, and including a rotatable impeller member and a runner member, one of said members including means for cooling said converter, temperature responsive means responsive to changes in the temperature of the fluid in said device and means operable in response to operation of said temperature responsive means at or above a predetermined temperature of said fluid for decreasing the engine load whereby to enable an increase in the rotative speed of said converter member including said cooling means, for inhibiting substantial further increase in the temperature of said fluid.

4. In a power transmission for a vehicle having an engine, a fluid power transmitting device drivingly connected to the engine, change speed means drivingly connected to said device, and adapted to provide a plurality of different speed ratio drives for said vehicle and temperature responsive means positioned in contact with the fluid of said device and operable at or above a predetermined temperature of said fluid for effecting a change in the speed ratio drive of said vehicle.

5. In a power transmission which includes a fluid power transmitting device and change speed gearing, power operated means for effecting step-up and step-down in speed ratio in said gearing; and means operable in response to fluid temperature in said fluid power transmitting device for controlling said power operated means.

6. In a power transmission which includes a fluid power transmitting device and change speed gearing, power operated means for effecting step-up and step-down in speed ratio in said gearing; and means for causing step-down in speed ratio automatically in response to attainment of abnormal temperature in said fluid power transmitting device.

7. In a power transmission comprising a fluid coupling and a gearbox arranged in tandem, a member in said gearbox adapted for shifting between high-speed and low-speed positions; power operated means for shifting said member; control means for said power operated means; and temperature responsive means disposed within said fluid coupling operatively associated with said control means.

8. In a power transmission for a vehicle having an engine, a fluid coupling and a gearbox arranged in tandem, a member in said gearbox adapted for shifting between high-speed and low-speed positions; power operated means for shifting said member; control means for said power operated means, including means for effecting momentary diminution in engine torque whereby said member can be shifted from high-speed to low-speed position during driving, and means operable in response to abnormal temperatures in said coupling for causing operation of said control means.

9. In a power transmission having a fluid power transmitting device and change speed means conditionable to vary the operating load on said device, power means operable for effecting changes in said change speed means upon abnormal temperature conditions prevailing in the fluid of said device, and means for controlling said power means including heat responsive means carried by said device.

10. A power transmission for a motor vehicle comprising a casing shell for holding fluid, a hydraulic pump wheel and a hydraulic turbine wheel for operation in said fluid, means for varying the vehicle load on said pump wheel and temperature responsive means carried by one of said casing and wheels and responsive to heat changes in the fluid for operating said load varying means to reduce the vehicle load on said pump wheel whereby to facilitate an increase in the rotative speed of said wheels.

11. A power transmission for a motor vehicle comprising a casing shell for holding fluid, a hydraulic pump wheel and a hydraulic turbine wheel for operation in said fluid, means for varying the vehicle load on said pump wheel and a thermostatic switch disposed within the casing shell and responsive to heat changes in the fluid for operating said load varying means to reduce the vehicle load on said pump wheel whereby to facilitate an increase in the rotative speed of said wheels.

12. A power transmission for a motor vehicle comprising a casing shell for holding fluid, a hydraulic pump wheel and a hydraulic turbine wheel for operation in said fluid, means for varying the vehicle load on said pump wheel and means for controlling said load varying means comprising a thermostatic switch disposed within the casing shell, a pair of slip rings carried outside said shell, and circuit means connecting said switch and slip rings, said switch being operably responsive to heat changes in the fluid.

13. In a power transmission for a vehicle having an engine, a fluid power transmitting device drivingly connected to the engine and including a fluid retaining shell, a change speed mechanism drivingly connected to said device and adapted to provide a plurality of different speed ratio drives for said vehicle, means for effecting a change in the speed ratio drive setting of said change speed mechanism, power means including a solenoid for operating said change effecting means, and control means for controlling said power means to effect a change in said change speed mechanism from a higher to a lower speed ratio drive upon an abnormal heat condition prevailing in the fluid of said fluid power transmitting device including a thermostatic switch disposed within said shell, a pair of slip rings disposed outside said shell, and circuit forming means between said switch and rings and between said rings and said power means.

14. In a power drive for a vehicle having an engine, a fluid power transmitting device drivingly connected to said engine and to the vehicle driving wheels, the fluid in said device having a normal operating temperature, temperature responsive means disposed as to be responsive to temperature changes in said fluid and operable at a predetermined abnormal temperature of said fluid, change speed means drivingly connected between said fluid device and vehicle driving wheels and having a high and a low speed ratio, said change speed means being operable in response to operation of said temperature responsive means to establish low speed ratio therein for facilitating a return of the temperature condition of said fluid to normal.

15. In a power drive for a vehicle having an engine, a fluid power transmitting device drivingly connected to said engine and to the vehicle driving wheels, the fluid in said device having a normal operating temperature, temperature responsive means disposed as to be responsive to temperature changes in said fluid and operable at a predetermined abnormal temperature of said fluid and change speed means drivingly connected between said fluid device and vehicle driving wheels operable in response to operation of said temperature responsive means for facilitating a return of the temperature condition of said fluid to normal.

16. In a power transmission for a vehicle having an engine, a fluid power transmitting device drivingly connected to said engine and to the vehicle driving wheels, temperature responsive means disposed in contact with the fluid of said device and operable at a predetermined temperature of said fluid, and means operable in response to operation of said temperature responsive means for effecting a change in the operative condition between said engine and vehicle driving wheels to facilitate a change in the temperature condition of said fluid.

17. In a power transmission for a vehicle having an engine, a fluid power transmitting device drivingly connected to the engine, and to the vehicle driving wheels, temperature responsive means responsive to changes in the temperature of the fluid in said device, and means operably associated with said device automatically operable in response to operation of said temperature responsive means at a predetermined temperature of said fluid for effecting a decrease in the engine load to thereby facilitate an increase in the rotative speed of said device.

18. In a power transmission for a vehicle having an engine, a fluid power transmitting device drivingly connected to said engine and to the vehicle driving wheels, the fluid in said device having a normal operating temperature, temperature responsive means disposed as to be responsive to temperature changes in said fluid and operable at a predetermined abnormal temperature of said fluid, and clutch means operable in response to operation of said temperature responsive means for effecting a change in the operative condition between said engine and vehicle driving wheels to facilitate a change in the temperature condition of said fluid.

LUDGER E. LA BRIE.

REFERENCES CITED

The following references are of record in the file of this patent:

UNITED STATES PATENTS

| Number | Name | Date |
| --- | --- | --- |
| 2,021,413 | Gille | Nov. 19, 1935 |
| 2,055,895 | Fawcett | Sept. 29, 1936 |
| 2,144,596 | Daiber | Jan. 17, 1939 |
| 2,156,493 | Durrell | May 2, 1939 |
| 2,230,777 | Hay | Feb. 4, 1941 |
| 2,337,748 | Gsching | Dec. 28, 1943 |
| 2,349,937 | Buchhart | May 10, 1944 |

FOREIGN PATENTS

| Number | Country | Date |
| --- | --- | --- |
| 446,979 | Great Britain | May 8, 1936 |
| 375,254 | Italy | Sept. 29, 1939 |
| 375,750 | Italy | Oct. 23, 1939 |